United States Patent
Horng et al.

(10) Patent No.: US 6,385,395 B1
(45) Date of Patent: May 7, 2002

(54) FAN MOTOR WITH ITS SPEED CONTROLLED BY OPERATING PERIODS OF A PULSE WAVE

(75) Inventors: Alex Horng; Nan Long Tsai, both of Kaohsiung (TW)

(73) Assignee: Sunonwealth Electric Machine Industry Co., Ltd., Kaohsiung (TW)

(*) Notice: Subject to any disclaimer, the term of this patent is extended or adjusted under 35 U.S.C. 154(b) by 0 days.

(21) Appl. No.: 09/781,972

(22) Filed: Feb. 14, 2001

(51) Int. Cl.⁷ ............................................. H02P 5/165
(52) U.S. Cl. ..................... 388/809; 318/254; 318/138; 318/439; 388/811; 388/816; 388/819
(58) Field of Search ................... 318/138, 439, 318/254, 700, 720; 388/809, 811, 816, 819, 934

(56) References Cited

U.S. PATENT DOCUMENTS

| | | | |
|---|---|---|---|
| 3,862,438 A | * 1/1975 | Sakakibar et al. | 318/139 |
| 4,347,468 A | * 8/1982 | Wilke | 318/139 |
| 5,197,858 A | 3/1993 | Cheng | |
| 5,942,866 A | 8/1999 | Hsieh | |

* cited by examiner

*Primary Examiner*—Karen Masih
(74) *Attorney, Agent, or Firm*—Bacon & Thomas, PLLC

(57) ABSTRACT

A fan motor whose speed is controlled by an operating period of pulse waves includes first and second rectifying circuits, a voltage comparison circuit, and a differential amplifier. A pulse wave is inputted into the first rectifying circuit, an actual speed signal detected from the fan is inputted into the second rectifying circuit, and the pulse wave and the speed signal are compared in the voltage comparison circuit. After comparison, a comparison voltage is outputted to a negative terminal of the differential amplifier. A partial voltage from a source voltage is connected to a positive terminal of the differential amplifier. The differential amplifier outputs a drive voltage after calculating a voltage difference between the comparison voltage and the partial voltage. Speed of the fan is changed in response to a change in the value of the drive voltage.

5 Claims, 5 Drawing Sheets

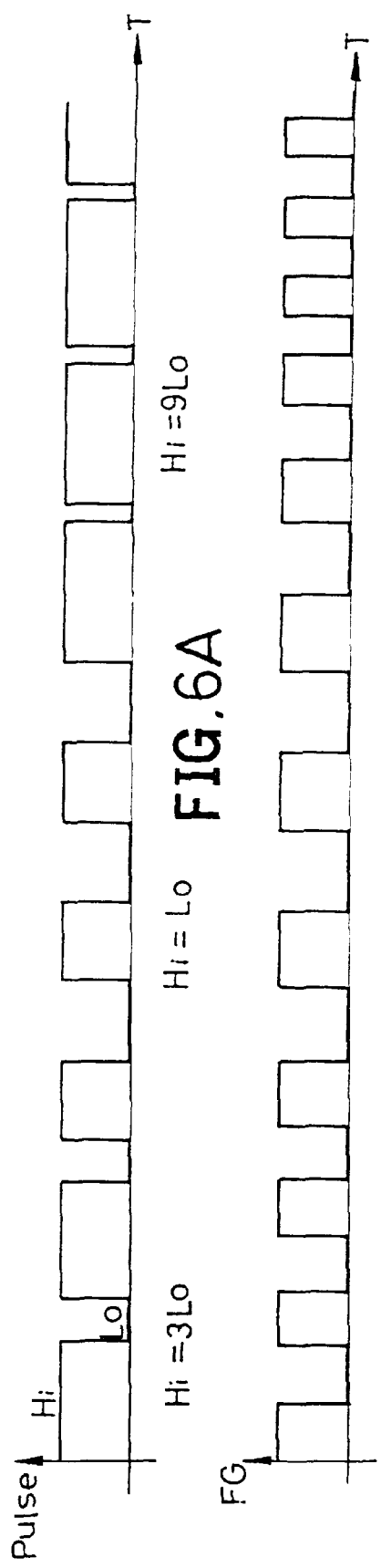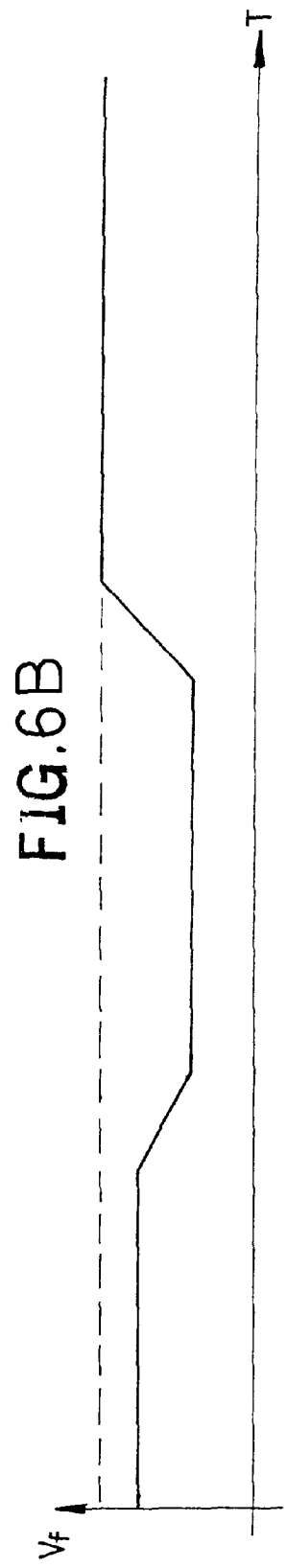
FIG. 6A
FIG. 6B
FIG. 6C

FAN MOTOR WITH ITS SPEED CONTROLLED BY OPERATING PERIODS OF A PULSE WAVE

BACKGROUND OF THE INVENTION

1. Field of the Invention

The present invention relates to a fan motor whose speed is controlled by operating periods of a pulse wave, and more particularly to a fan motor into which a pulse wave is inputted for controlling rotational speed of the fan by changing the operating period without changing the frequency of the pulse wave. The fan rotates smoothly while increasing or decreasing its speed, thereby lengthening the longevity of the fan.

2. Description of the Related Art

A conventional fan motor is shown in FIG. 1 and FIG. 2 (including FIGS. 2A–2C) of the drawings that correspond to FIG. 2 and FIG. 5 (including FIGS. 5A–5C) of U.S. Pat. No. 5,197,858 to Cheng issued on Mar. 30, 1993. FIG. 1 is a circuit diagram of a controller for the fan. FIG. 2 illustrates the output waveforms for the drive IC of the circuit. As illustrated in FIG. 1, when the power is on, via an inverse voltage protection diode D1, impellers start to rotate by mutual induction between winding coils and magnet. At this time, a Hall element IC1 senses the variation of magnetic field between winding and magnet to cause the DC brushless motor to commute as follows: A predetermined current and DC level are supplied by resistors R3, R2. Positive (V+) and negative (V−) voltages are both output from the Hall element IC1 to a driving integrated circuit IC2. The two voltage waveforms can be shaped by means of the driving integrated circuit IC2 by comparing them with an internal voltage to obtain the waveform shown in FIG. 2A. This waveform controls semiconductor switches A1 and A2 to obtain the waveform shown as FIGS. 2B and 2C. Motor windings L1, L2, L3, and L4 are controlled by the wave output from the semiconductor switches A1, A2 to commutate in accordance with the magnetic couple with magnet. The capacitor C1 provides voltage to the driving integrated circuit IC2 for re-starting of the motor from a completely motionless state of the fan. As a result, a driving system composed of IC1 and IC2 can drive the fan and output a cycle-timing pulse signal.

IC3 comprises three internal operational amplifiers IC31, IC32, IC33. Operational amplifiers IC31, with resistors R4, R5, R6, R7, R8, R9, R10 and a thermal sensor Rth in combination, forms a control circuit for the slope of the curve of the speed versus the temperature of the thermal control variable speed fan. Because the resistance value of the thermal sensor Rth changes with temperature, the voltage Vth which is dependent upon the resistance of sensor Rth and resistor R4 will also be changed as the temperature changes. Voltage Vth and the reference voltage Vref, which is controlled by the voltage divider formed by resistors R9 and R10, are input into operational amplifier IC31, to obtain a variable voltage Vo, which causes the collector current of transistor TR1 to change accordingly, changing the speed of the fan. Therefore, the object of the variable speed by thermal control is achieved.

Nevertheless, the waveforms output from the drive integrated circuit IC2 to the windings L1, L2, L3, and L4 are rectangular waveforms, as shown in FIGS. 2B and 2C. In addition, although the change in the output voltage Vb by the operational amplifier IC31 in response to change in the environmental temperature make a change in the conductive current in the transistor TR2, output waveforms of the transistor TR2 are still rectangular waveforms. Thus, rotating speed of the fan is increased or reduced suddenly due to rectangular waveforms inputted to the windings L1, L2, L3, and L4. As a result, the fan wobbles and thus has a shortened longevity.

Another conventional fan motor is shown in FIGS. 3 and 4 of the drawings that correspond to FIGS. 2 and 3 of U.S. Pat. No. 5,942,866 to Hsieh issued on Aug. 24, 1999. FIG. 3 is a schematic block diagram of a control circuit. FIG. 4 shows the voltage signal outputted from a switching device of the control circuit. As illustrated in FIG. 3, a control circuit 10 for a DC brushless fan comprises a rectifying circuit 20, a comparator 21, and a switching device 22. The rectifying circuit 20 receives a continuous, rectangular wave signal from the fan 23, which is indicative of the rotating speed of the fan 23, and then sends a rectified and filtered DC voltage signal V1 to inverted input terminal of the comparator 20. The non-inverted input terminal of the comparator 21 is connected to a reference voltage signal Vref, which is used for setting the rotating speed of the fan 23, and the output terminal of the comparator 21 is connected to the switching device 22. The switching device 22 may be a transistor or an equivalent electronic switch that is serially connected between a source voltage Vcc and the source terminal of the fan 23. The operation of the switching device 22 depends on the compared result of the rectified. DC voltage signal V1 outputted from the rectifying circuit 21 and the reference voltage signal Vref. When the DC voltage signal V1 outputted from the rectifying circuit 21 is lower than the reference voltage signal Vref, i.e., the rotating speed of the fan 23 is lower than its setting value, the comparator 21 outputs a Logic high value to the switching device 22. Then, the switching device 22 is closed, and the fan 23 is powered on. Thus, rotating speed of the fan 23 will be increased.

In contrast, when the DC voltage signal outputted from the rectifying circuit 20 is higher than the reference voltage signal Vref, i.e., the rotating speed of the fan 23 is higher than its setting value, the comparator 21 outputs a Logic low value to the switching device 22. Then, the switching device 22 is opened, and the fan 23 is powered off Thus, rotating speed of the fan 23 will be decreased.

In operation, the switching device 22 is repeatedly closed and opened as the rotating speed of the fan varies, thus the fan is intermittently powered on, whereby the rotating speed of the fan 23 can be controlled and kept at a constant value. As illustrated in FIG. 4, the output signal of the switching device 22 is an intermittently opened and closed rectangular wave, where the period (TIME ON) during which the switching device 22 is closed and the period (TIME OFF) during which the switching device 22 is opened are modulated so as to control the rotating speed of the fan 23.

Nevertheless, the output waveform is an intermittently opened and closed rectangular waveform, and the rotating speed of the fan 23 is increased or decreased suddenly in response to opening or closing of the rectangular waveform or the switching device 22. As a result, the fan wobbles and thus has a shortened longevity.

SUMMARY OF THE INVENTION

In view of the above drawbacks, the present invention provides a fan motor whose speed is controlled by operating periods of a pulse wave. The pulse wave is inputted into a rectifying circuit and then connected to a voltage comparison circuit. An actual speed signal detected from the fan is inputted into the voltage comparison circuit after passing through a rectifying circuit. The pulse wave and the speed signal are compared in the voltage comparison circuit, and a comparison voltage is outputted to a negative terminal of a differential amplifier after comparison. The differential amplifier outputs a drive voltage for driving the fan after calculating a voltage difference between the comparison voltage and a partial voltage from a source voltage. The drive voltage has linear smooth waveforms such that the speed of the fan increases or decreases gradually to thereby avoid sudden change in the speed of the fan, thereby lengthening longevity of the fan.

Other objects, specific advantages, and novel features of the invention will become more apparent from the following detailed description and preferable embodiments when taken in conjunction with the accompanying drawings.

BRIEF DESCRIPTION OF THE DRAWINGS

FIG. 6A is a schematic diagram illustrating control signals having rectangular waveforms.

FIG. 6B is a schematic diagram illustrating signals detected from the fans.

FIG. 6C is a schematic diagram illustrating waveforms of a drive voltage outputted to the fan.

DETAILED DESCRIPTION OF THE PREFERRED EMBODIMENT

A preferred embodiment in accordance with the present invention will now be described with reference to the accompanying drawings.

Figure 1:
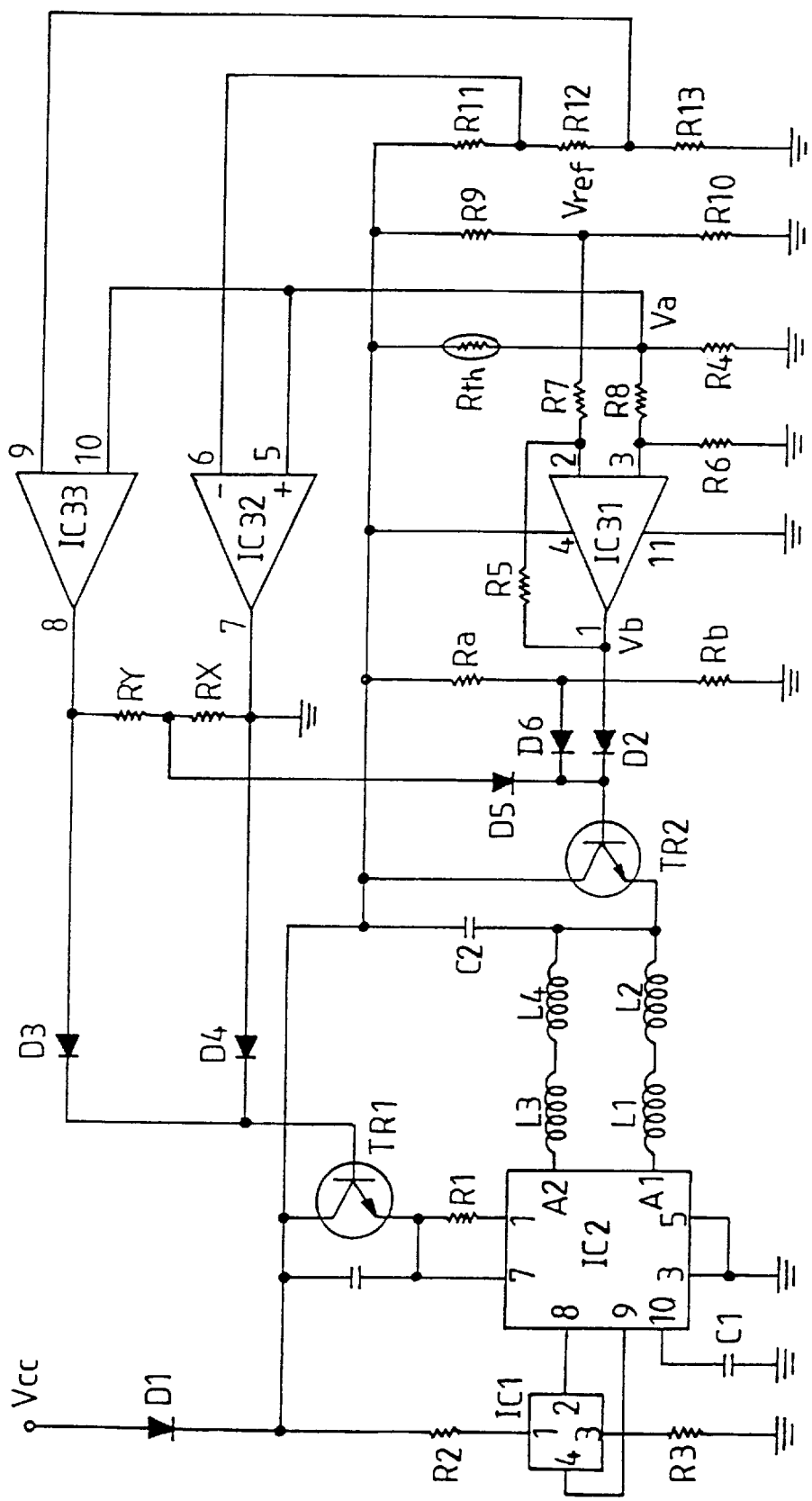
FIG. 1 is a circuit diagram of a conventional controller for the fan.
Figure 2:
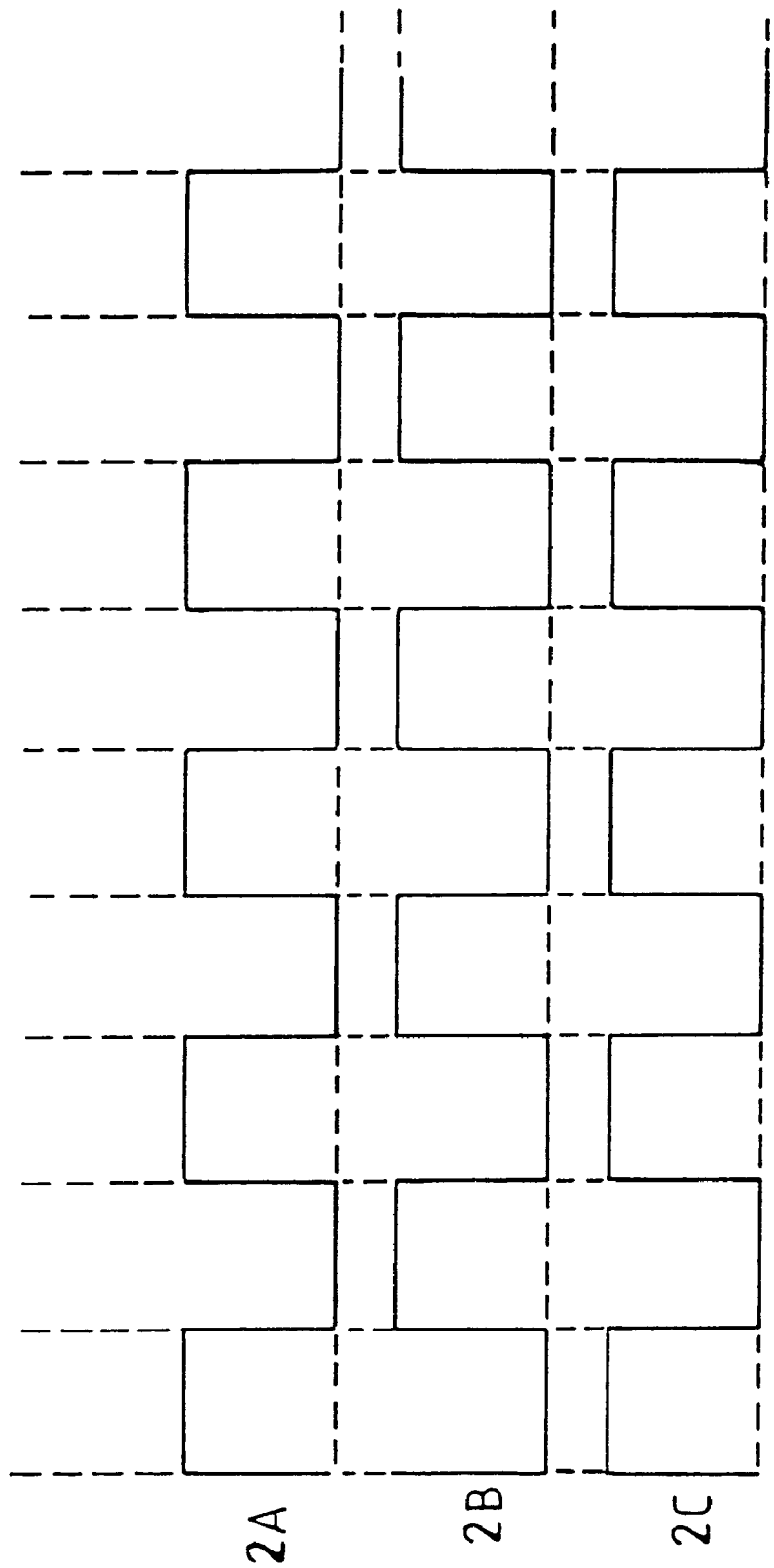
FIG. 2 is a diagram illustrating the output waveforms for the drive IC of the circuit in FIG. 1.
Figure 3:
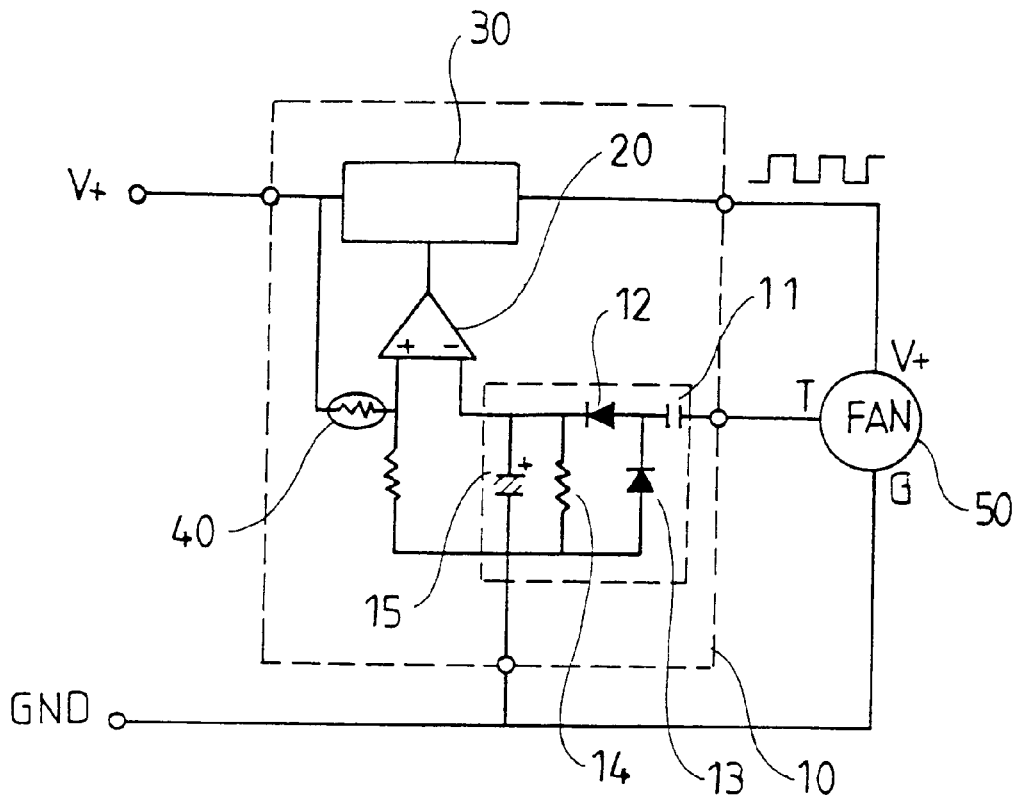
FIG. 3 is a schematic block diagram of another conventional control circuit.
Figure 4:
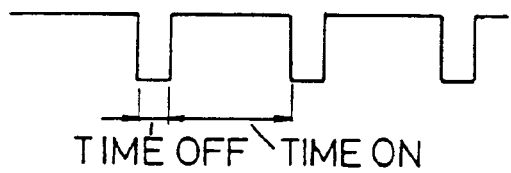
FIG. 4 shows the voltage signal outputted from a switching device of the control circuit in FIG. 3.
Figure 5:
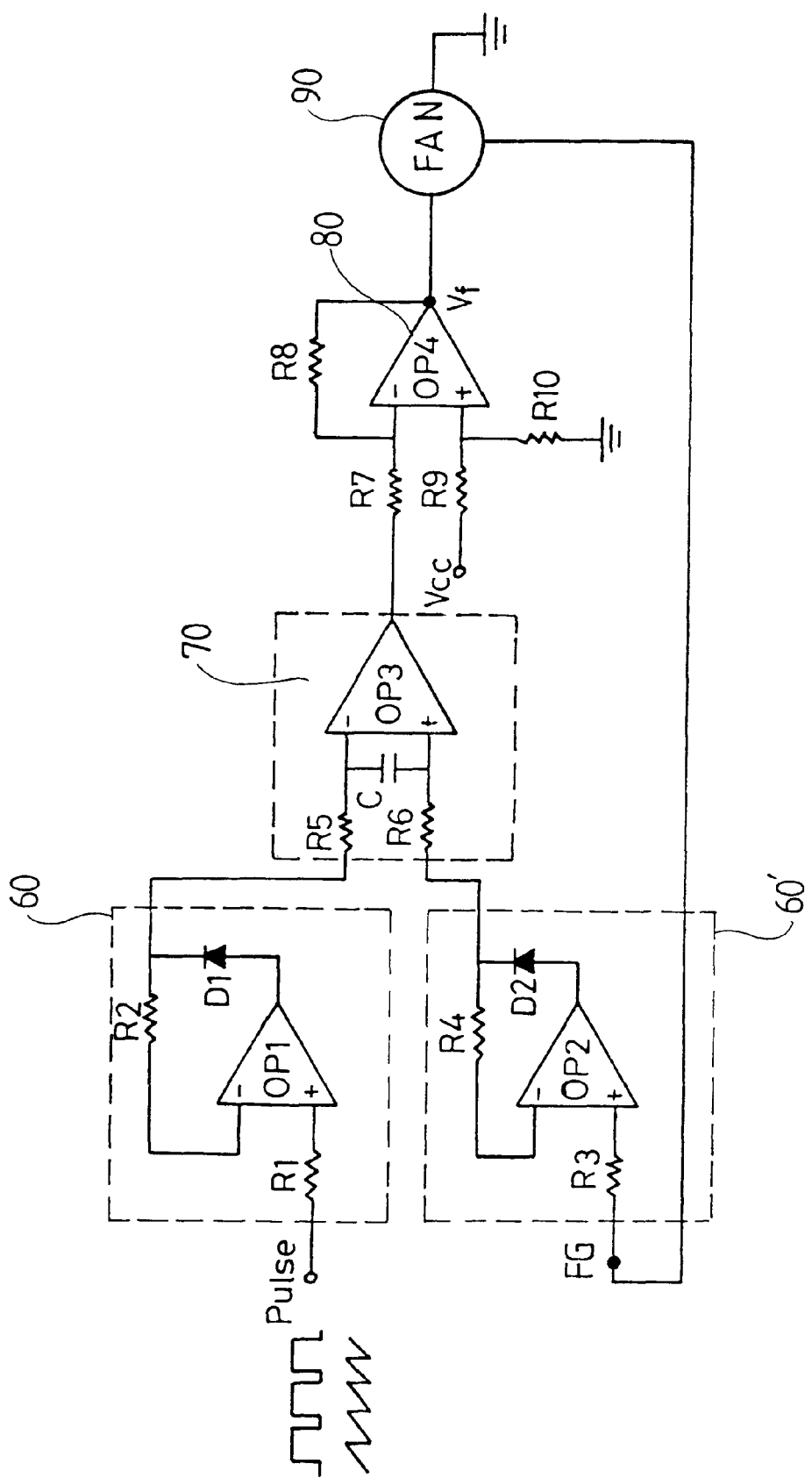
FIG. 5 is a diagram of a circuit for a fan motor in accordance with the present invention.

Referring to FIG. 5, a fan motor whose speed is controlled by operating periods of a pulse wave in accordance with the present invention generally includes a first rectifying circuit 60, a second rectifying circuit 60', a voltage comparison circuit 70, and a differential amplifier 80. The first rectifying circuit 60 is mounted between the voltage comparison circuit 70 and an input (see Pulse in FIG. 5) of a pulse wave. The first rectifying circuit 60 includes an operational amplifier OP1, two resistors R1 and R2, and a diode D1. The voltage comparison circuit 70 includes two resistors R5 and R6, a capacitor C, and an operational amplifier OP3. The input (Pulse) of the pulse wave is used to input operating period variable rectangular waves or triangular waves with the frequency thereof remaining unchanged. After rectifying the pulse wave, the first rectifying circuit 60 outputs a voltage to the negative terminal of the operational amplifier OP3 of the voltage comparison circuit 70.

The second rectifying circuit 60' is mounted between the voltage comparison circuit 70 and a speed signal input terminal FG. The second rectifying circuit 60' includes an operational amplifier OP2, two resistors R3 and R4, and a diode D2. The speed signal FG detected from the fan 90 is rectified by the second rectifying circuit 60' and a voltage is outputted to the positive terminal of the operational amplifier OP3 of the voltage comparison circuit 70. The voltage comparison circuit 70 compares the rectified pulse voltage with the rectified speed signal voltage and then outputs a comparative voltage that is outputted to a negative terminal of the differential amplifier 80 via a resistor R7. A source voltage Vcc, after passing through a resistor R9 to part the voltage, is electrically connected to a positive terminal of the differential amplifier 80. The differential amplifier 80 outputs a drive voltage Vf after calculating a voltage difference between the comparison voltage from the negative terminal and the partial voltage from the source voltage Vcc from the positive terminal. The drive voltage Vf may be used to control speed of the fan. When the operating period of the input wave is changed, the comparison voltage outputted by the voltage comparison circuit 70 is also changed. As a result, the drive voltage Vf that is obtained by calculating a voltage difference between the partial voltage from the source voltage Vcc and the comparison voltage by the differential amplifier 80 is changed. Since the operating period changes (increases or decreases), the comparison voltage outputted by the voltage comparison circuit 70 increases or decreases gradually such that the drive voltage Vf outputted by the differential amplifier 80 is varied gradually. Accordingly, the speed of the fan is increased or reduced gradually. Sudden change in the speed of the fan is avoided and the longevity of the fan is thus lengthened.

Referring to FIG. 6A, when a rectangular wave is inputted via the input (Pulse), the rectangular wave is set to allow a change in the operating periods with the frequency remaining unchanged. High voltage (operating voltage) is labeled as Hi above the time axis, and low voltage is labeled as Lo on the time axis. The time axis includes a first zone wherein Hi=3Lo, a second zone wherein Hi=Lo, and a third zone wherein Hi=9Lo.

When the rectangular wave represents waveforms in the first zone (Hi=3Lo), the voltage value of the rectangular wave outputted to the negative terminal of the voltage comparison circuit 70 via the rectifying circuit 60 is higher than the voltage value of the speed signal FG detected from the fan and outputted to the positive terminal of the voltage comparison circuit 70 via the second rectifying circuit 60'. Thus, the voltage comparison circuit 70 outputs the lower voltage to the negative terminal of the differential amplifier 80 and makes the differential amplifier 80 output a higher drive voltage Vf (FIG. 6C).

When the rectangular wave is transiting from the first zone (Hi=3Lo) into the second zone (Hi=Lo), the frequency remains unchanged. The voltage value of the rectangular wave outputted to the negative terminal of the voltage comparison circuit 70 via the rectifying circuit 60 decreases gradually. As a result, the voltage comparison voltage 70 outputs a gradually increasing voltage to the negative terminal of the differential amplifier 80. The drive voltage Vf outputted by the differential amplifier 80 decreases gradually.

When the rectangular represents the waveforms in the second zone (Hi=Lo), the frequency of the speed signal FG detected from the fan and outputted to the second rectifying circuit 60' is decreased. Therefore, the voltage value of the positive terminal of the voltage comparison circuit 70 is higher than the negative terminal of the voltage comparison circuit 70. The voltage comparison circuit 70 outputs a higher voltage to the negative terminal of the differential amplifier 80 and makes the differential amplifier 80 output a lower drive voltage Vf (FIG. 6C).

When the rectangular wave is transiting from the second zone (Hi=Lo) into the third second zone (Hi=Lo), the operating period is widened with the frequency remaining unchanged. The voltage value of the rectangular wave outputted to the negative terminal of the voltage comparison circuit 70 via the rectifying circuit 60 increases gradually. As a result, the voltage comparison voltage 70 outputs a gradually decreasing voltage to the negative terminal of the differential amplifier 80. The drive voltage Vf outputted by the differential amplifier 80 increases gradually.

When the rectangular wave represents the waveforms in the third zone (Hi=9Lo), the voltage value of the rectangular wave outputted to the negative terminal of the voltage comparison circuit 70 via the rectifying circuit 60 is higher than the voltage value of the speed signal FG detected from the fan and outputted to the positive terminal of the voltage comparison circuit 70 via the second rectifying circuit 60'. Thus, the voltage comparison circuit 70 outputs the lower voltage to the negative terminal of the differential amplifier 80 and makes the differential amplifier 80 output a higher drive voltage Vf (FIG. 6C).

In accordance with the present invention, the operating periods of the pulse wave are changed with the frequency remaining unchanged, such that the fan is either controlled to operate at a predetermined speed or changes speed gradually. The drive voltage Vf for the fan increases or decreases gradually such that the fan speed increases or decreases gradually. The drive voltage for the fans disclosed in U.S. Pat. Nos. 5,197,858 and 5,942,866 generates rectangular waveforms such that the speed of the fan increases or decreases suddenly. The fan wobbles due to the sudden speed change and the longevity of the fan is shortened. Yet, in the fan in accordance with the present invention, the speed increases or decreases gradually. This is achieved by means of using a voltage comparison circuit to compare the inputted pulse wave and the speed signal and inputting the comparison voltage outputted by the voltage comparison circuit to a differential amplifier that calculates a voltage difference between the comparison voltage and a partial voltage from a source voltage and then outputs a smooth drive voltage Vf.

Although the invention has been explained in relation to its preferred embodiment as mentioned above, it is to be understood that many other possible modifications and variations can be made without departing from the scope of the invention. It is, therefore, contemplated that the appended claims will cover such modifications and variations that fall within the true scope of the invention.

What is claimed is:

1. A fan motor with its speed controlled by operating periods of a pulse wave, the fan motor comprising:

a fan, a speed signal being detectable from the fan for converting into a first voltage;

an input for a pulse wave having an unchanging frequency for converting into a second voltage;

a voltage comparison circuit for comparing the first voltage converted from the speed signal detected from the fan with the second voltage inputted from the input and then outputting a comparison voltage;

a differential amplifier connected between the fan and the voltage comparison circuit, the differential amplifier including a positive terminal to which a voltage source is inputted and a negative terminal to which the comparison voltage is inputted, the differential amplifier outputting a drive voltage that varies in response to a change in the voltage difference between the positive terminal and the negative terminal;

wherein when the operating period of the pulse wave is decreased, the second voltage is decreased, when the second voltage decreases gradually, the voltage comparison circuit outputs a gradually increasing voltage to the negative terminal of the differential amplifier, the differential amplifier outputs a gradually decreasing drive voltage such that the fan speed decreases gradually; and wherein when the operating period of the pulse wave is increased, the second voltage is increased, when the second voltage increases gradually, the voltage comparison circuit outputs a gradually increasing voltage to the negative terminal of the differential amplifier, the differential amplifier outputs a gradually increasing drive voltage such that the fan speed increases gradually.

2. The fan motor as claimed in claim 1, wherein the pulse wave is a rectangular wave.

3. The fan motor as claimed in claim 1, wherein the pulse wave is a triangular wave.

4. The fan motor as claimed in claim 1, further comprising a first rectifying circuit and a second rectifying circuit, the first rectifying circuit being connected between the voltage comparison circuit and the input for the pulse wave for converting the pulse wave into the first voltage, the second rectifying circuit being connected between the voltage comparison circuit and an input for the speed signal for converting the speed signal into the second voltage.

5. The fan motor as claimed in claim 1, wherein the voltage comparison circuit includes two resistors, a capacitor, and an operational amplifier.

* * * * *